(12) United States Patent
Nelson (10) Patent No.: US 9,940,462 B2
(45) Date of Patent: *Apr. 10, 2018

(54) CODE VALIDATION

(71) Applicant: Hewlett-Packard Development Company, L.P., Houston, TX (US)

(72) Inventor: Marvin D. Nelson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,794

(22) Filed: May 3, 2017

(65) Prior Publication Data

US 2017/0235959 A1 Aug. 17, 2017

Related U.S. Application Data

(63) Continuation of application No. 13/561,530, filed on Jul. 30, 2012, now Pat. No. 9,715,591.

(51) Int. Cl.
*G06F 11/00* (2006.01)
*G06F 21/57* (2013.01)
*G06F 21/64* (2013.01)
*H04L 9/30* (2006.01)

(52) U.S. Cl.
CPC .......... *G06F 21/575* (2013.01); *G06F 21/64* (2013.01); *H04L 9/30* (2013.01); *G06F 2221/034* (2013.01)

(58) Field of Classification Search
CPC .............. G06F 21/57; G06F 2221/033; G06F 9/44589; G06F 21/575
See application file for complete search history.

(56) References Cited

U.S. PATENT DOCUMENTS

| | | | | |
|---|---|---|---|---|
| 5,189,700 A * | 2/1993 | Blandford | ............... | G06F 21/34 340/5.8 |
| 6,138,236 A * | 10/2000 | Mirov | ............... | G06F 9/24 712/E9.007 |
| 6,587,947 B1 | 7/2003 | O'Donnell et al. | | |
| 7,424,398 B2 | 9/2008 | Booth et al. | | |
| 7,627,658 B2 * | 12/2009 | Levett | ............... | G06F 9/46 709/203 |
| 8,826,261 B1 | 9/2014 | Anand | | |
| 2004/0025010 A1 | 2/2004 | Azema | | |
| 2004/0107349 A1 | 6/2004 | Sasselli et al. | | |
| 2004/0268339 A1 | 12/2004 | Van Someren et al. | | |
| 2005/0033973 A1 | 2/2005 | Kamada et al. | | |

(Continued)

FOREIGN PATENT DOCUMENTS

WO WO-2012095441 7/2012

OTHER PUBLICATIONS

Abhik Roychoudhury, Embedded Systems and Software Validation, http://www.comp.nus.edu.sg/~abhik/Book/Preface_and_TOC.pdf 12 pages.

*Primary Examiner* — Farid Homayounmehr
*Assistant Examiner* — Lizbeth Torres-Diaz
(74) *Attorney, Agent, or Firm* — HP Inc. Patent Department (57) ABSTRACT

Methods and apparatus for validating a system include reading protected record data for a section of the system from a secure storage element, and verifying integrity of the section of the system using the record data. The secure storage element independently verifies that all record data and data to be written to the system is valid.

20 Claims, 6 Drawing Sheets

(56) References Cited

U.S. PATENT DOCUMENTS

| | | | |
|---|---|---|---|
| 2005/0097328 A1* | 5/2005 | England | G06F 9/4416 |
| | | | 713/173 |
| 2005/0198051 A1* | 9/2005 | Marr | G06F 21/52 |
| 2006/0075287 A1 | 4/2006 | Vageline et al. | |
| 2007/0162964 A1 | 7/2007 | Wang | |
| 2007/0300207 A1* | 12/2007 | Booth | G06F 21/575 |
| | | | 717/126 |
| 2008/0168564 A1* | 7/2008 | Lerouge | G06F 21/64 |
| | | | 726/26 |
| 2009/0282477 A1* | 11/2009 | Chen | G06F 21/51 |
| | | | 726/22 |
| 2010/0082955 A1 | 4/2010 | Chhabra et al. | |
| 2012/0005480 A1 | 1/2012 | Batke et al. | |
| 2012/0017081 A1* | 1/2012 | Courtney | G06K 7/10722 |
| | | | 713/156 |

\* cited by examiner

CODE VALIDATION

PRIORITY

This application is a Continuation of commonly assigned and co-pending U.S. patent application Ser. No. 13/561,530, filed Jul. 30, 2012, the disclosure of which is hereby incorporated by reference in its entirety.

BACKGROUND

Peripheral components for computers and computer systems are increasingly connected or connectable to the internet. As such, the peripheral components, such as but not limited to printers, mobile telephones, routers, and the like, are subject to attack by hackers and viruses. This is typically because while computers have been hardened against attack by hackers, the peripheral components have not been hardened against attack.

DETAILED DESCRIPTION

In the following detailed description of the present examples, reference is made to the accompanying drawings that form a part hereof, and in which is shown by way of illustration specific examples of the disclosure which may be practiced. These examples are described in sufficient detail to enable practice of the subject matter of the disclosure, and it is to be understood that other examples may be utilized and that process, electrical or mechanical changes may be made without departing from the scope of the present disclosure. The following detailed description is, therefore, not to be taken in a limiting sense.

As peripheral components to computers become increasingly connected to the internet, hacker attacks and viruses are becoming more prevalent among those peripherals. This is, in part, because the peripherals have typically not been hardened against attack by hackers and viruses.

In order to ensure that peripheral components are more secure from attack, one consideration is ensuring that the code running on the peripheral component is that code which is intended to be run on the component. In order for that to occur, typically a root of trust is established. Once a root of trust is established, anything executed or offered by that root of trust is also trusted. Common practice for ensuring that the code is that code which is intended to be run is using validation of hashes or cyclic redundancy check (crc) for the code. However, the hash or crc of code that is changing is also changing and therefore uses a secure means to not only update the code, but also the keys to validate the code. In order to be secure, the means of storing the code and the means of storing the validation keys are separate entities.

A typical root of trust is built starting with a read only memory (ROM). ROM is one-time programmable, and when the ROM is run first, that immutable piece of code executes first. After the initial loading, additional pieces of code may be run, building from the root of trust. Since pieces of code after the root of trust is loaded are changing, the validation keys such as a public key, hash, or crc code are stored at some location available to the ROM. Storage of validation keys in a ROM is impractical because if a private key is corrupted, or if the hash/crc changes, the ROM becomes worthless. For example, when a public key is coded into a ROM, and an associated private key is used to embed hashes for machine readable instructions, such as software, into a signed key for updated code, once the private key is broken or corrupted, the public key immutably embedded in the ROM renders it worthless.

Therefore, using some element that can be changed becomes increasingly desirable. However, as soon as any opportunity that some piece of code comprising machine readable instructions, such as in firmware or software, can be executed that will allow alterations, then the root of trust is compromised. Traditionally, peripheral manufacturers use what is described as trusted software to attempt to ensure that what is written to secure storage is valid. However, in an embedded system, there is no guarantee that a single secure software element can protect a key storage, since other parts of the embedded system can be made to update any part of the hardware system. Once a single piece of software or firmware is cracked, that piece can alter the hardware as a trusted component. Code may then be altered to look valid, while it is not.

One way that has been attempted to secure peripherals is the use of a completely separate processor with a separate ROM different than the operating processor and ROM. The separate processor and separate ROM is out of band and cannot be updated. The function of the separate processor and separate ROM is solely to find a root of trust on a network, to retrieve data identifying and allowing validation of code that is running in the component. This option is expensive, cannot be updated, and requires a network for performing validation.

Figure 1:
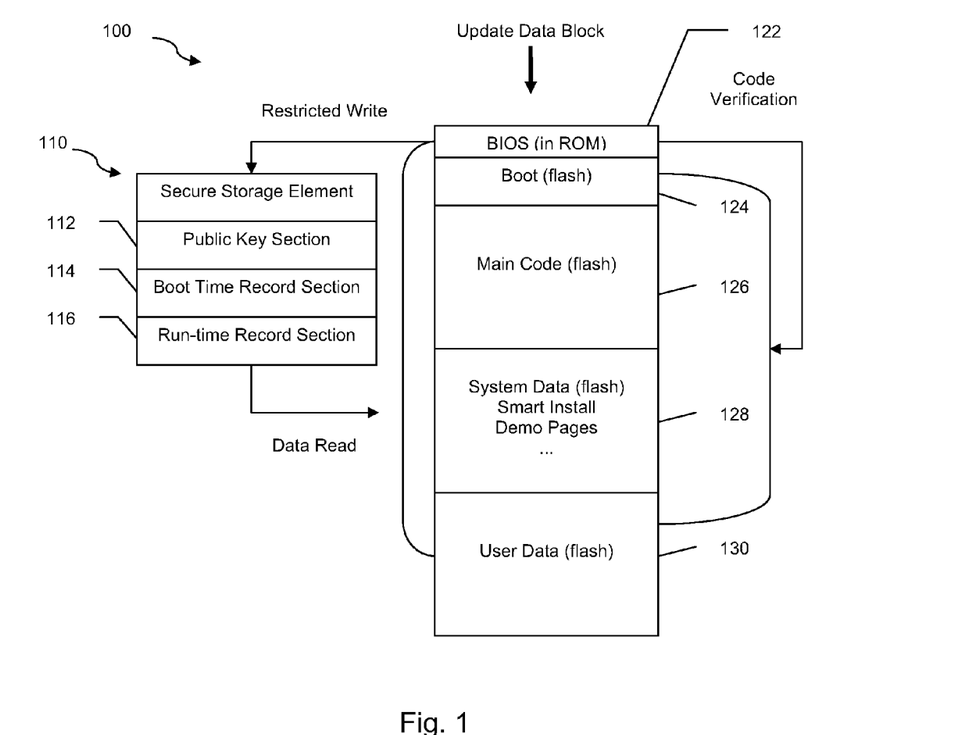
FIG. 1 is a block diagram of a system according to an example of the present disclosure.

A system 100 is shown in FIG. 1. System 100 comprises in one example a secure storage element 110, and a peripheral component 120, such as a printer, mobile telephone, router, or the like. Secure storage element 110 comprises in one example a block of storage 112 (e.g., EPROM, EEPROM, flash, or other changeable non-volatile memory) for storing a validation key for decoding incoming data, a block of storage 114 (e.g., EPROM, EEPROM, flash, or other changeable non-volatile memory) for storing records containing information for validation of sub-systems of the peripheral component 120 at boot time, and a block of storage 116 (e.g., EPROM, EEPROM, flash, or other changeable non-volatile memory) for storing records containing information for validation of sub-systems of the peripheral component 120 at run-time. Information for validation of sub-systems in one example includes by way of example only and not by way of limitation a specified region of an execution data space (e.g., a code space) typically identified by a start address and an end address, the address range having associated hashes, checksums, crc values, public keys, or other integrity information to validate the specified region of data space.

The block of storage 112 for storing a validation key for incoming data contains information that allows the secure storage element 110 to decode a portion of a signed update data block that is loaded by the BIOS, such as by downloading, or by being supplied in some other fashion to the BIOS. The update data block (which may also be referred to as a blob, package, or update package, for example) is prepared by the entity responsible for the peripheral component 120 to be updated, for example the manufacturer of the component, and is in general outside of the system 100.

The secure storage element 110 is a hardware component that is capable of independently authenticating and validating data, such as a record data sub-block received in an update data block, that it stores after the data associated with the record data is written to system flash. The secure storage element is not dependent on firmware or other hardware (such as that in the peripheral component 120) for such authentication and validation. The form of an update data block is discussed further below referring also to FIG. 2, and further detail on the storage within the secure storage element is discussed further below referring also to FIG. 3. The peripheral component 120 does not have the ability to issue write commands to the secure storage element 110. An outside entity, such as the manufacturer, uses a private key corresponding to the public key stored in the secure storage element storage 112 to update or change storages 112, 114, or 116 provided the identity of the author is validated by the secure storage element 110, and also to update flash memory of the peripheral component 120. Any section of the peripheral component 120 (e.g., sections 122, 124, 126, 128, 130) may be allowed to read the records 114, 116 from the secure storage element 110, but is not allowed to write to the secure storage element. Alternatively, an outside entity can use a different public key for the general encryption of and update data block and its internal sub-blocks, as long as that internal sub-block dedicated to writing record data into the secure storage element is encrypted with the public key currently stored in the secure storage element.

Peripheral component 120 may include, for example, a BIOS 122 stored in ROM format, and other sub-systems, such as but not limited to boot code 124, main code 126, system data 128, and user data 130, each stored in flash or other non-volatile, changeable memory. The flash part of the peripheral component is updatable by using the contents of storage 114 (boot time keys) in conjunction with ROM 122 to ensure that system 100 is running the code intended for the device at boot time. The flash part of the peripheral component may include more or fewer sections than shown, depending on the system.

The update data block contains in one example code to be updated in the flash memory of the peripheral component 120, packaged and signed with, for example, a private key of the manufacturer for which the public key is stored in the secure storage element 110, in one example in block 112, and record data in a portion of the update data block that is written to the secure storage element after verification and authentication by the secure storage element. Decryption with the public key provides the signature of the manufacturer for the incoming data, allowing verification by known methods (asymmetric keying, crc, hash code, etc. . . . ) of the signature. Once verification is complete, the incoming data is written to the flash memory of the peripheral component 120, and then a portion of the update data block is sent to the secure storage element, where it is used to update one or more of storages 112, 114, and 116 after verification and authentication by the secure storage element. The secure storage element 110 then contains secure validation information for the peripheral component 120 and its sub-systems. Further, the secure storage element 110 may be used in another example to store additional items, including but not limited to items used to validate certificates and/or to create other valuable roots of trust in addition to the ability to validate code. Such items may also be stored in the storage 112, 114, or 116, or in a separate additional block of memory (not shown).

There may be a time when a public key stored in the secure storage element should be changed, such as when a private key of the manufacturer has become corrupt or known. In such a circumstance, a signed update data block is provided from the manufacturer, encrypted with the private key, that when decrypted contains instructions to write a new public key, contained in the data, to the secure storage element. Then, the next update data block received is encrypted with a new private key for which the new public key written to the secure storage element is used for validation to find a proper signature. In this way, a change in the private and public keys is propagated to the secure storage element, which is written upon receipt of valid information from the manufacturer, but not from any source that does not have the proper private key to sign and encrypt data, and the ROM can remain generic but still trust the secure storage element.

The secure storage element, in another example, allows partial writing of the key data, and sets a "valid to write" flag enabling updates of individual sections of code while leaving remaining keys unchanged. As the system is updated in parts, the individual parts are managed as an update occurs. Portions of the secure storage element are updated when record data to be updated is identified by setting an update flag for that record.

Figure 2:
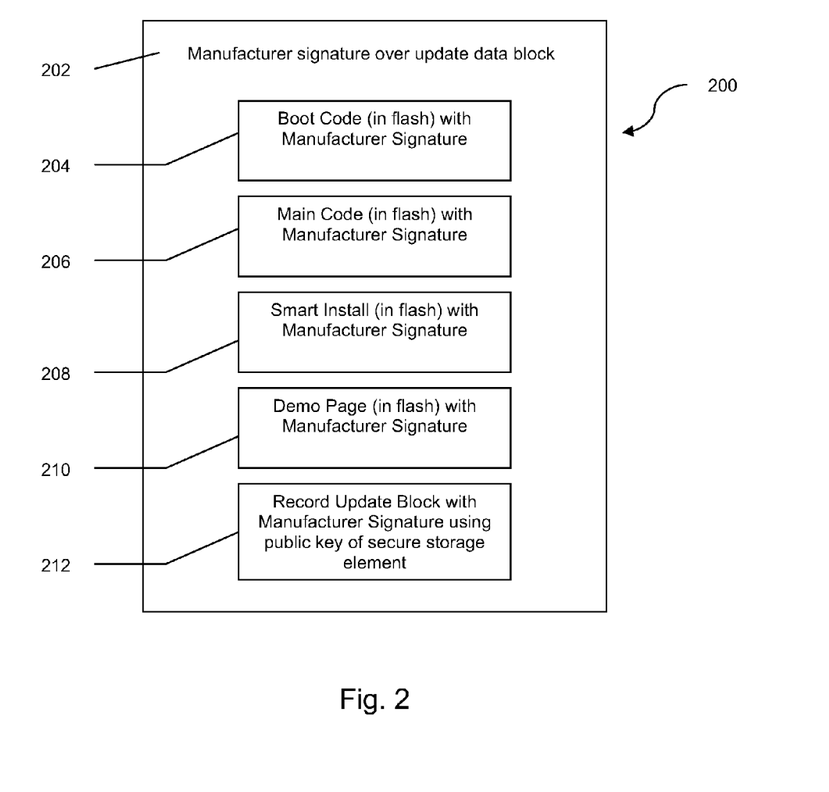
FIG. 2 is a block diagram of an update data block according to an example of the present disclosure.

The contents of one example of an update data block 200 are shown in greater detail in FIG. 2. The update data block is transmitted from a manufacturer or the like, or otherwise received at the BIOS 122. The update data block is signed and packaged by the manufacturer, and contains a manufacturer signature 202 for the entire update data block 200, individual update blocks 204, 206, 208, and 210 for one or more of the respective sub-systems (such as sub-systems 124, 126, 128, and 130 described above) of the peripheral component 120. These update blocks 204, 206, 208, and 210 are individually signed blocks of data that are to be written to their respective sub-system flash. Once the update data block is validated by the BIOS using a public key (which could be a supplied public key, available public key, or public key stored in secure storage element 110), the code in sub-blocks 204, 206, 208, and 210 is written to the appropriate sub-system flash in the peripheral component 120.

Figure 3:
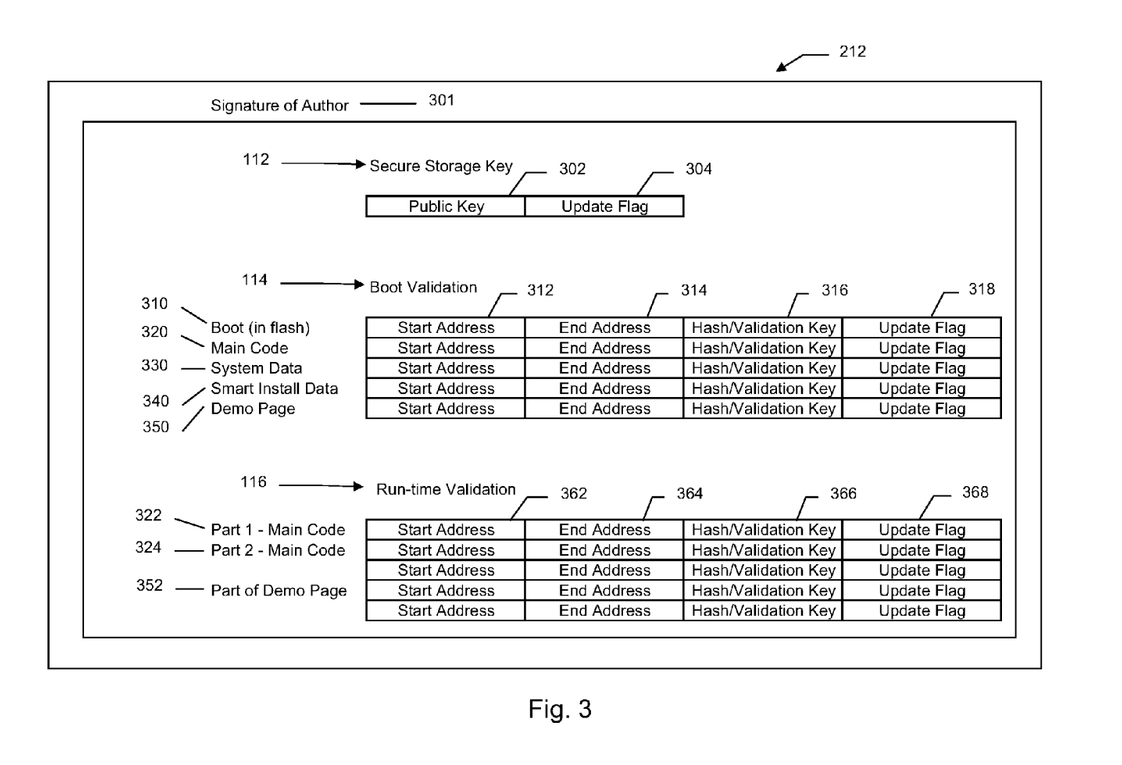
FIG. 3 is a block diagram of a record data block according to an example of the present disclosure.

When all individual update blocks have been verified and written to the appropriate sub-system flash, a record block 212, individually signed by the manufacturer with the private key corresponding to the public key stored in secure storage element 110, is verified and decoded using the public key stored in the secure storage element. The record block 212 contains information for updating the records in storage 114 and 116 of the secure storage element 110, including by way of example start addresses 312, end addresses 314, validation keys 316, and update flags 318 for each of the records in storage 114, and start addresses 362, end addresses 364, validation keys 366, and update flags 368 for each of the sub-records in storage 116, as described in further detail below.

In one example, the records for storage 114 address compressed code space stored in flash sections of the peripheral component, and the records for storage 116 address expanded code space loaded into random access memory (RAM) of the peripheral component. The expanded code runs in RAM so as to allow it to operate more quickly in a run-time situation.

Referring now to FIG. 3, further detail of a record data block such as block 212 is shown, with reference to specific portions of secure storage element 110 also noted in the Figure for illustrative purposes. Record data block 212 is signed with the signature of the author 301, and comprises in one example records for updating storage portion 302 for storing validation information, in this example a public key that is associated with a manufacturer private key, and storage portion 304 for an update flag for storage portion 302. When a record data block is received from the BIOS by the secure storage element, it is verified as signed and complete using the public key currently stored in storage portion 112. Should the update data block indicate that the public key storage portion 112 is to be updated, the update flag from storage portion 304 is set to true, and the new public key 302 is written to storage portion 112.

Block 212 comprises in one example records 210, 220, 230, 240, and 250 for storage in storage 114 of secure storage element 110, such as those described above, each record containing a start address 312, end address 314, hash, crc, or other validation key 316, and update flag 318. These records are accessible to the ROM in boot validation, as described herein. When a record data block is received from the BIOS by the secure storage element, it is verified as signed and complete using the public key currently stored in storage portion 112, as described above. Should the record data block indicate that the any of portions 310, 320, 330, 340, or 350 is to be updated, the update flag 318 for that particular portion is set to true. Storage 114 and record data block 212 may include more or fewer storage portions than shown, depending on the system.

Figure 6:
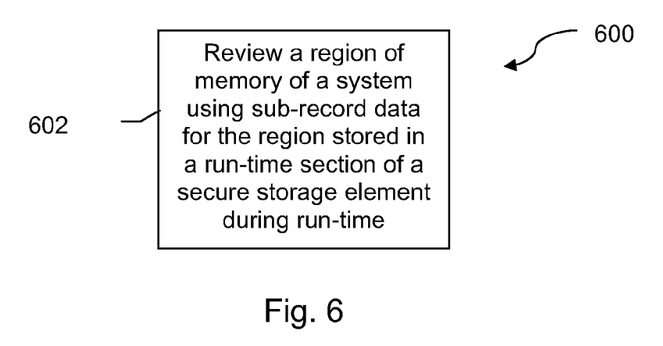
FIG. 6 is a flow chart diagram of a method according to yet another example of the present disclosure.

Block 212 also comprises in one example records 322, 324, and 353 (by way of example only) associated with one or more of the records 310, 320, 330, 340, and 350. These records are used in one example for run-time validation, as described herein. In storage 116, for example, each of two sub-records 322 and 324 each contain a start address 362, end address 364, hash, crc, or other validation key 366, and update flag 368 for a portion of the main code record 320 of storage 114, and sub-record 352 contains a start address 362, end address 364, hash, crc, or other validation key 366, and update flag 368 for a portion of the main code record 350 of storage 114. When a record data block is received from the BIOS by the secure storage element, it is verified as signed and complete using the public key currently stored in storage portion 112, as described above. Should the record data block indicate that the any of sub-records 322, 324, 352 is to be updated, the update flag 368 for the sub-records portions of that particular portion are set to true. Storage 116 may include more or fewer storage portions than shown, depending on the system. Run-time validation using the storage 116 is described in greater detail below with respect to FIG. 6.

Figure 4:
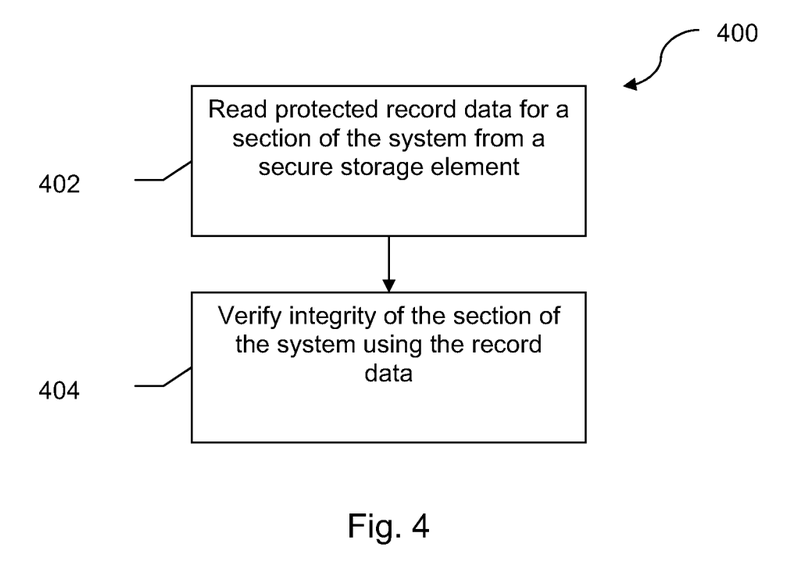
FIG. 4 is a flow chart diagram of a method according to an example of the present disclosure.

A method 400 of validating a system at boot time, such as system 100, is shown in flow chart form in FIG. 4. Method 400 in one example comprises reading protected record data for a section of the system from a secure storage element in block 402, and verifying integrity of the section of the system using the record data in block 404. The integrity of remaining sections of the system is verified in another example using record data for each respective section of the remaining sections of the system, the record data for each respective section stored in the secure storage element.

Figure 5:
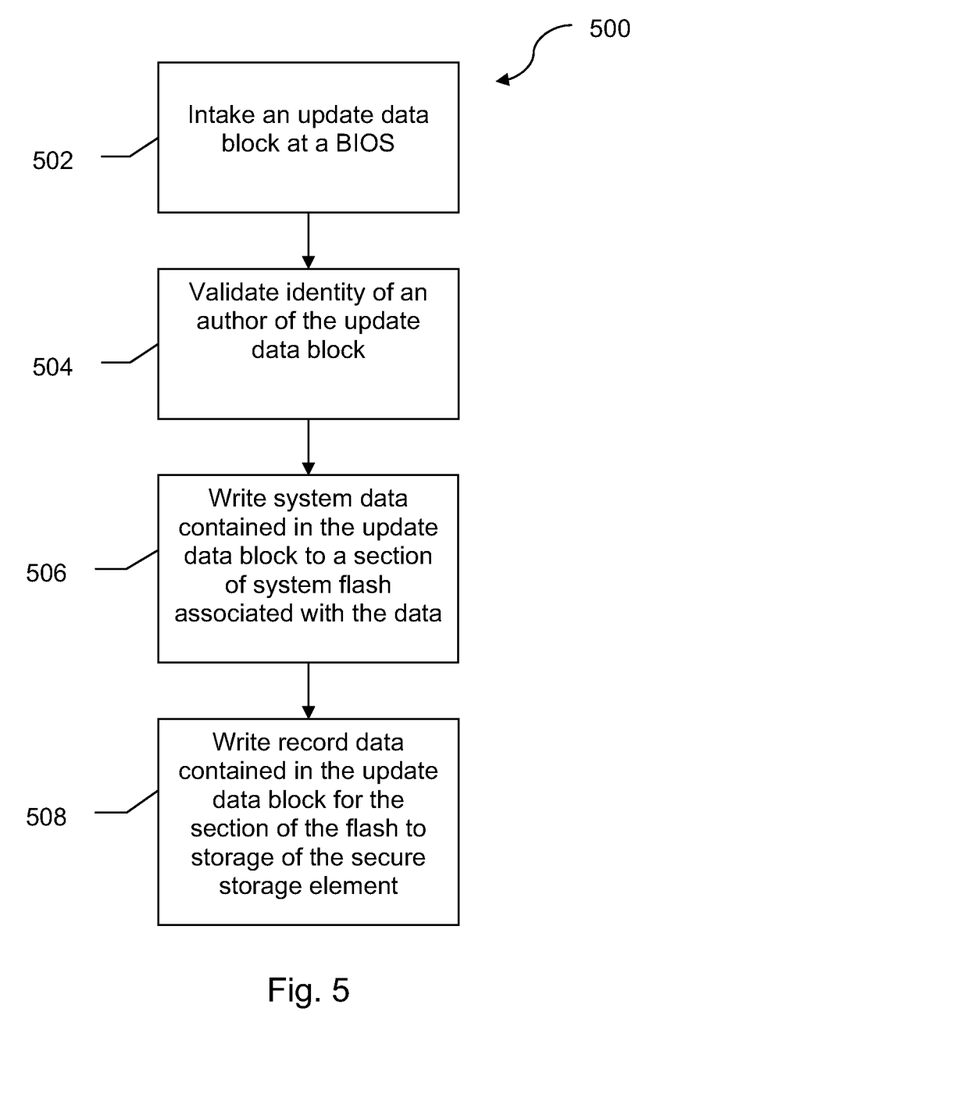
FIG. 5 is a flow chart diagram of a method according to another example of the present disclosure.

A method 500 for updating flash in a system is shown in flow chart form in FIG. 5. Method 500 comprises, in one example, intaking an update data block at a secure storage element in block 502, validating an identity of the author of the update data block in block 504, writing system data contained in the update data block to a section of system flash associated with the data in block 506, and writing record data contained in the update data block for the section of the flash to storage of the secure storage element in block 508. Intaking of an update data block may be by one of many methods without departing from the scope of the disclosure. Intaking may include receiving via an internet connection, a hardwired connection, a wireless connection, or the like. For example, the update data block may be downloaded, or it may be supplied in some other fashion to the secure storage element. The update data block is produced by the entity that has the rights to modify the system flash, such as the entity that distributes the system or the product in which the system flash is used, and is signed, for example, with a known signature for the manufacturer. The signed update data block is encoded using, for example, a private key, and the public key stored in the secure storage element is used to decrypt the update data block.

The secure storage element, such as element 110 described above with respect to FIG. 1, provides the ability to use a ROM as a root of trust for operation of a system, while allowing the ROM itself to be generic, that is, without containing a validation key or hash that may become corrupted or outdated and therefore unusable. The ROM works with the secure storage element, and is programmed to know where in the secure storage element its validation element (e.g., a hash or a public key) is stored. By using the validation element of the secure storage element, and the data stored in the secure storage element for hashes or other keys for other elements of the system, the ROM can validate that other elements of the system are valid even though they are flashable or changeable. This is because the data in the secure storage element is validated by the providing entity. The other elements of the system may have changing validation information, such as hashes/crc checks, and the like, but the secure storage element contains the current validation information for those elements, and the ROM uses the information stored in the secure storage element to validate that the other elements of the system are valid.

Since no set of machine readable instructions, such as firmware or software, has the ability to write to the secure storage element, and only the provider of the element can write to the secure storage element, there is no corruption of firmware or software that can corrupt the secure storage element. When new code is to be placed into the flash memory of the system, an update data block is packaged together and signed by the provider (in one example, the manufacturer, who is the only entity with the proper key, such as a private key, for signing the code). Once received, the update data block is validated at the secure storage element using the validation key, such as a public key, before being written to the flash memory of the system, with record information (as described above) for the new code stored in the secure storage element to match the new code that is to be written to the flash memory of the system.

The secure storage element 110 has information stored therein that generic code running in the component 120, such as in the BIOS, can access and use to validate further parts of the component 120. Alternatively, validation can be chained. For example, the BIOS 122 can validate that the boot code 124 is correct, and the boot code 124 can validate that the main code is correct, and so forth. Each sub-part of the component 120 may use the secure storage element and the data therein to validate the next part of the component, as the secure storage element has validation keys in the form of, for example, crc code, hash code, or public key, for each sub-part.

While some data is likely to be written to the secure storage element for each update of information, the amount of data to be written is typically small, such as a crc check, hash code, or public key for a specific address range in the ROM or the system itself.

In addition to validation of a peripheral component such as component 120 at start-up, the secure storage element 110 may also be used, in another example, to perform run-time checking to make sure that the component 120 is still running valid code, and that no corruption has taken place during run-time. A method 600 showing run-time validation is shown in flow chart form in FIG. 6. Method 600 comprises reviewing a region of memory of a system (e.g., of a peripheral component) using sub-record data for the region stored in a run-time section of a secure storage element (such as section 116 of secure storage element 110) during run-time in block 602. Reviewing further comprises in one example computing a run-time validation key on a specific address range in the system corresponding to sub-record information for the section, and comparing the computed run-time validation key to respective validation key data from the secure storage element for that address range in the system.

In greater detail, the secure storage element contains information about each sub-part of the component, such as where the sub-part is in the address space of the component, and what the hash or crc over that address space is supposed to be. An instruction may be sent from the secure storage element to the component to run a check on a certain address range or a certain sub-part of the component. The root of trust (for example the BIOS) of the system reads data from the start address to the end address provided, and creates a hash or crc for that address range. This hash or crc is compared with the stored hash or crc in the secure storage element. If the hashes/crcs match, the sub-part of the component is still running valid code.

The BIOS, in one example, loads intrusion detection pieces randomly, so that any intruder to the peripheral component may be detected during run-time. Because the run-time checks are random, that is, various parts of the peripheral are checked at variable times and in variable order, an intruding piece of code will not have proper crc or hash codes to properly validate the particular area. The runtime check in one example uses the external entity to randomize the queries (e.g., address ranges etc. . . . ) in such a way that an intruding piece of code, be it machine readable instructions, such as software, firmware, or some combination thereof, cannot easily answer with the proper information. In one example, the system looks for cycles of inactivity, and during inactivity, picks one of the validation identifiers in the secure storage element, such as a starting address, an ending address, and the resulting hash for that address range. Random in the sense that it is used herein does not mean that checking for run-time intrusion is not thought through, but instead that the timing, address range, and area of the component code that is checked will not have a predictable pattern. A run-time check may be initiated by the BIOS, the system, or the secure storage element, but it is the BIOS that determines what sections or sub-sections of the system are checked, and when.

Because the secure storage element writes only a limited amount of information, the opportunities for a hacker to break its decryption is also limited. The address ranges and hash or crc values that are written to the secure storage element are typically small. Further, even if a public key is known and is used in the secure storage element, the knowledge of the public key does not give knowledge of the private key. Still further, the private key is used in one example, as discussed above, to sign a message that sends a new public key to the secure storage element that will then be used to validate messages signed with a new private key.

The ability to switch public keys and to write new public key information to the secure storage element also allows the use of different private keys for different components from the same manufacturer. For example, since the public key stored in a secure storage element can be changed, each product may have its own private/public key combination, further increasing security.

Implementations of FIGS. 1-6 of the present disclosure can be instantiated by machine-readable instructions, e.g., software, to cause a processor to perform methods disclosed herein. The machine-readable instructions can be stored on non-transitory computer-usable storage media in the form of volatile or non-volatile storage. Examples of storage media include solid-state memory (e.g., Read-Only Memory (ROM), Random-Access Memory (RAM), Flash memory, etc.); optical media (e.g., CD, DVD, Blu-Ray™ disks, etc.), magnetic media (e.g., magnetic disks and disk drives, magnetic tape, etc.). Such storage media may be a component part of a computer system, or it may include a removable storage medium.

Figure 7:
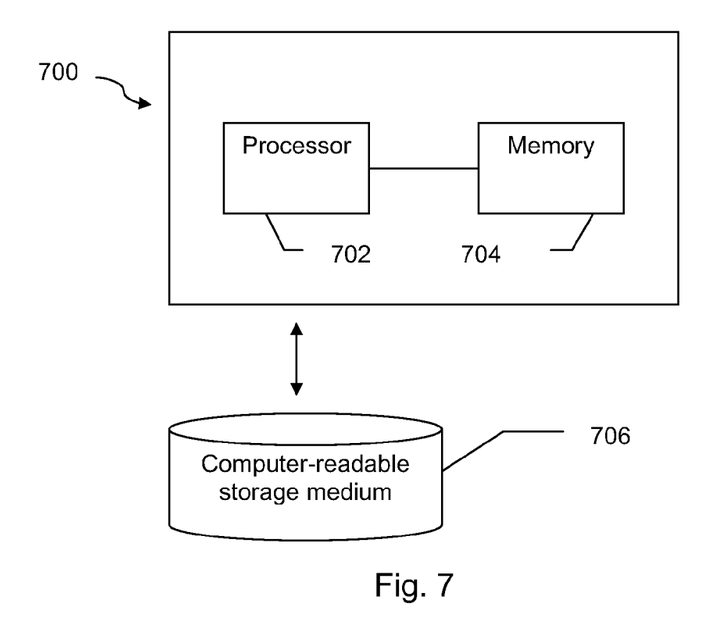
FIG. 7 is a block diagram of an example of a computer system for use with various implementations.

FIG. 7 is a block diagram of an example of a computer system 700 having a processor 702, memory 704 and a tangible storage media 706 in communication with the processor 702 for use with various implementations. The storage media 706 includes a non-transitory storage medium and has machine-readable instructions stored thereon to cause the processor 706 to perform methods disclosed herein.

Although specific examples have been illustrated and described herein it is manifestly intended that the scope of the claimed subject matter be limited only by the following claims and equivalents thereof.

What is claimed is:

1. A method comprising:
obtaining, by a processor of a device, first record data from a storage element, wherein the storage element contains the first record data for validating code at boot time of the device and second record data for validating the code during run time of the device;
validating, by the processor, the code for a particular sub-system of the device at the boot time of the device using the first record data without using the second record data;
obtaining, by the processor, the second record data from the storage element; and
validating, by the processor, the code for the particular sub-system of the device during the run time of the device using the second record data without using the first record data.

2. The method of claim 1, further comprising:
validating code for remaining sub-systems of the device at the boot time of the device using boot-time record data obtained from the storage element for each of the remaining sub-systems; and
validating the code for the remaining sub-systems of the device during the run time of the device using run-time record data obtained from the storage element for each of the remaining sub-systems.

3. The method of claim 1, further comprising:
   storing the code to be validated at the boot time of the device in a compressed code space in a flash section of the device; and
   storing the code to be validated during the run time of the device in an expanded code space in a random access memory (RAM) of the device.

4. The method of claim 1, wherein the storage element is a secure storage element separate from the device.

5. The method of claim 1, wherein the code for the particular sub-system to be validated at the boot time of the device is stored in a first region of data space of the device, and the code for the particular sub-system to be validated during the run time of the device is stored in a second region of the data space of the device.

6. The method of claim 1, further comprising:
   updating data stored in a section of a flash of the device from update data contained in an update data block only after the storage element has validated an identity of an author of the update data contained in the update data block.

7. The method of claim 6, wherein after the storage element has validated the identity of the author of the update data, the storage element is to store the update data for the section of the flash of the device as a data record, including a start address of a location in the storage element where the update data is stored, an end address of the location, a validation key, and an update flag.

8. A device comprising:
   a processor; and
   a memory storing instructions that when executed by the processor cause the device to:
     obtain first record data from a storage element, wherein the storage element contains the first record data for validating code at boot time of the device and second record data for validating the code during run time of the device,
     validate the code for a particular sub-system of the device at the boot time of the device using the first record data without using the second record data,
     obtain the second record data from the storage element, and
     validate the code for the particular sub-system of the device during the run time of the device using the second record data without using the first record data.

9. The device of claim 8, wherein the instructions are further to cause the device to:
   validate code for remaining sub-systems of the device at the boot time of the device using boot-time record data obtained from the storage element for each of the remaining sub-systems, and
   validate the code for the remaining sub-systems of the device during the run time of the device using run-time record data obtained from the storage element for each of the remaining sub-systems.

10. The device of claim 8, wherein the instructions are further to cause the device to:
    store the code to be validated at the boot time of the device in a compressed code space in a flash section of the device, and
    store the code to be validated during the run time of the device in an expanded code space in a random access memory (RAM) of the device.

11. The device of claim 8, wherein the storage element is a secure storage element separate from the device.

12. The device of claim 8, wherein the code for the particular sub-system to be validated at the boot time of the device is stored in a first region of data space of the device, and the code for the particular sub-system to be validated during the run time of the device is stored in a second region of the data space of the device.

13. The device of claim 8, wherein the instructions are further to cause the device to:
    update data stored in a section of a flash of the device with update data contained in an update data block only after the storage element has validated an identity of an author of the update data contained in the update data block.

14. The device of claim 13, wherein after the storage element has validated the identity of the author of the update data, the storage element is to store the update data for the section of the flash of the device as a data record, including a start address of a location in the storage element where the update data is stored, an end address of the location, a validation key, and an update flag.

15. A non-transitory computer readable medium storing instructions that when executed by a processor of a device cause the processor to:
    obtain first record data from a storage element, wherein the storage element contains the first record data for validating code at boot time of the device and second record data for validating the code during run time of the device;
    validate the code for a particular sub-system of the device at the boot time of the device using the first record data without using the second record data;
    obtain the second record data from the storage element; and
    validate the code for the particular sub-system of the device during the run time of the device using the second record data without using the first record data.

16. The non-transitory computer readable medium of claim 15, wherein the instructions are further to cause the device to:
    validate code for remaining sub-systems of the device at the boot time of the device using boot-time record data obtained from the storage element for each of the remaining sub-systems; and
    validate code for the remaining sub-systems of the device during the run time of the device using run-time record data obtained from the storage element for each of the remaining sub-systems.

17. The non-transitory computer readable medium of claim 15, wherein the instructions are to cause the device to:
    store the code to be validated at the boot time of the device in a compressed code space in a flash section of the device; and
    store the code to be validated during the run time of the device in an expanded code space in a random access memory (RAM) of the device.

18. The non-transitory computer readable medium of claim 15, wherein the code for the particular sub-system to be validated at the boot time of the device is stored in a first region of data space of the device, and the code for the particular sub-system to be validated during the run time of the device is stored in a second region of the data space of the device.

19. The non-transitory computer readable medium of claim 15, wherein the instructions are to cause the processor to:
    update data stored in a section of a flash of the device with update data contained in an update data block only after the storage element has validated an identity of an author of the update data contained in the update data block.

20. The non-transitory computer readable medium of claim 19, wherein after the storage element has validated the identity of the author of the update data, the storage element is to store the update data for the section of the flash of the device as a data record, including a start address of a location in the storage element where the update data is stored, an end address of the location, a validation key, and an update flag.

* * * * *